United States Patent [19]

Williams, Jr. et al.

[11] Patent Number: 4,938,904
[45] Date of Patent: Jul. 3, 1990

[54] METHOD OF PRODUCING FASCIA PARTS

[75] Inventors: Nelson E. Williams, Jr., Hamilton, Ill.; Forrest F. Baum, Keokuk

[73] Assignee: Sheller-Globe Corporation, Toledo, Ohio

[21] Appl. No.: 297,675

[22] Filed: Jan. 13, 1989

Related U.S. Application Data

[62] Division of Ser. No. 106,181, Oct. 8, 1987, Pat. No. 4,822,438.

[51] Int. Cl.$^5$ .................. B28B 1/02; B28B 1/08; B29C 33/40
[52] U.S. Cl. .................. 264/71; 264/219; 264/310
[58] Field of Search ............ 249/114, 111; 425/435; 156/94, 264, 265, 245, 297, 329, 307.7, 290, 291, 289; 264/219, 134, DIG. 57, 261, 69, 71, 301–303, 310

[56] References Cited

U.S. PATENT DOCUMENTS

| | | |
|---|---|---|
| 1,484,437 | 2/1924 | Thompson . |
| 1,804,920 | 5/1931 | Edwards . |
| 1,879,872 | 9/1932 | Hofmann ............ 249/111 |
| 2,114,353 | 4/1938 | Powell ............... 156/291 |
| 2,184,140 | 12/1939 | Cunnington ......... 156/290 |
| 2,348,829 | 5/1944 | MacArthur et al. ... 264/DIG. 57 |
| 2,367,490 | 1/1945 | Ducklo .............. 156/265 |
| 2,913,785 | 11/1959 | Kramig, Jr. . |
| 2,998,968 | 9/1961 | Hossard ............. 156/538 |
| 3,121,649 | 2/1964 | Oliver ............... 156/289 |
| 3,431,397 | 3/1969 | Webb ................ 156/245 |
| 3,514,069 | 5/1970 | Daley ................ 249/111 |
| 3,541,195 | 11/1970 | Anderson et al. .... 264/219 |
| 3,631,898 | 1/1972 | Harley .............. 156/264 |
| 3,728,098 | 4/1973 | Giffen . |
| 3,778,323 | 12/1973 | Posner .............. 156/289 |
| 3,795,566 | 3/1974 | Epley ................ 156/538 |
| 3,933,335 | 1/1976 | Maruyama et al. ... 156/289 |
| 3,989,787 | 11/1976 | Scott, Jr. et al. . |
| 4,024,007 | 5/1977 | Jago et al. .......... 264/219 |
| 4,225,109 | 9/1980 | Yotsutsuji et al. . |
| 4,363,681 | 12/1982 | Williams ............ 156/264 |
| 4,626,309 | 12/1986 | Mullen, III et al. .. 156/289 |
| 4,639,285 | 1/1987 | Suzuki et al. ....... 156/329 |
| 4,709,624 | 12/1987 | Croft ................ 156/291 |
| 4,716,003 | 12/1987 | Gaudreau ........... 249/111 |
| 4,717,521 | 1/1988 | Border et al. ....... 264/219 |

*Primary Examiner*—Jan H. Silbaugh
*Assistant Examiner*—Karen D. Kutach
*Attorney, Agent, or Firm*—Harness, Dickey & Pierce

[57] ABSTRACT

A process for making a substantially even thickness fascia part. The fascia part is prepared by placement of a plastic powdered material into an enclosed mold, heating and agitating the mold for distributing the plastic powder on the mold surfaces to provide a substantially even thickness fascia part on the molding surface. The mold includes first mold surfaces for defining critical portions of the mold which correspond to the desired portions of the mold for forming the finished shape of the part by melting of the plastic powder to a uniform film along the surface. The mold also includes second mold surfaces defining non-critical portions of the mold where it is undesirable for plastic filming to occur. The process for making a fascia part includes cutting a plurality of sections of insulating material to fit the non-critical portions of the mold, coating the non-critical portions of the mold with a heat resistant bonding material before assembling the cut sections onto the non-critical portions followed by curing of the bonding material and thereafter releasing a plastic powder into the mold. The mold is then heated to a temperature for melting the plastic powder material. The mold is rotationally agitated for distributing the plastic material onto critical molding surfaces. The plastic is prevented from covering the non-critical surfaces by heat insulation of these surfaces.

3 Claims, 3 Drawing Sheets

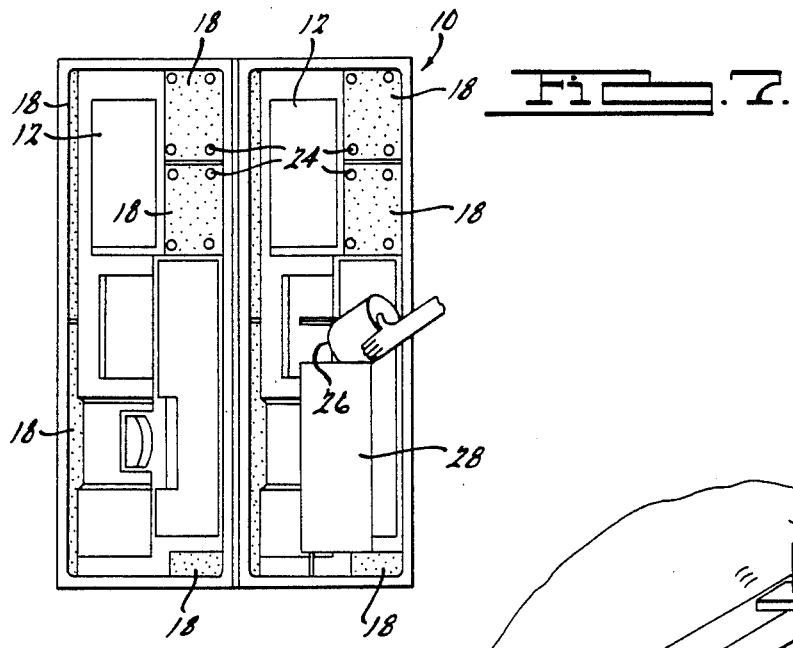
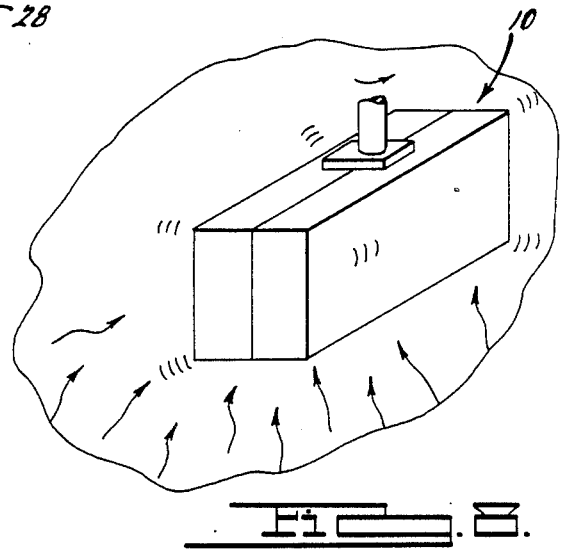
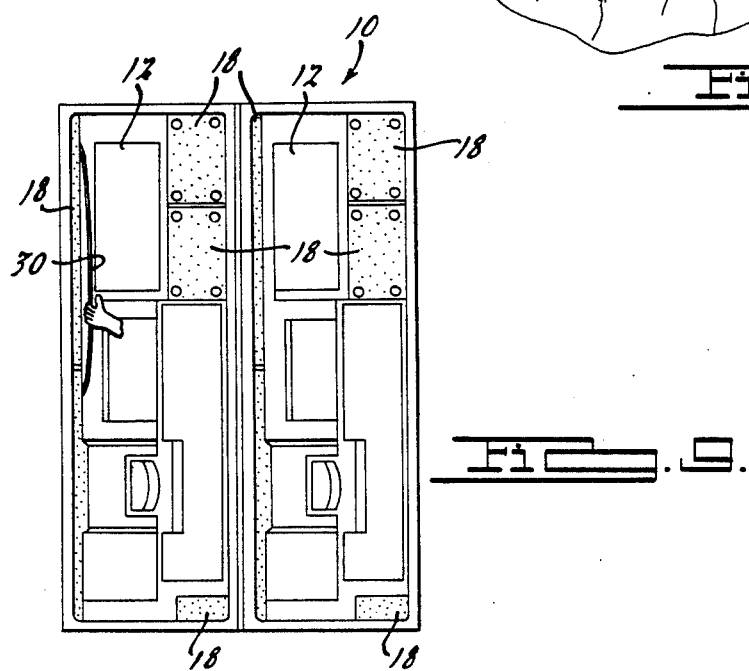

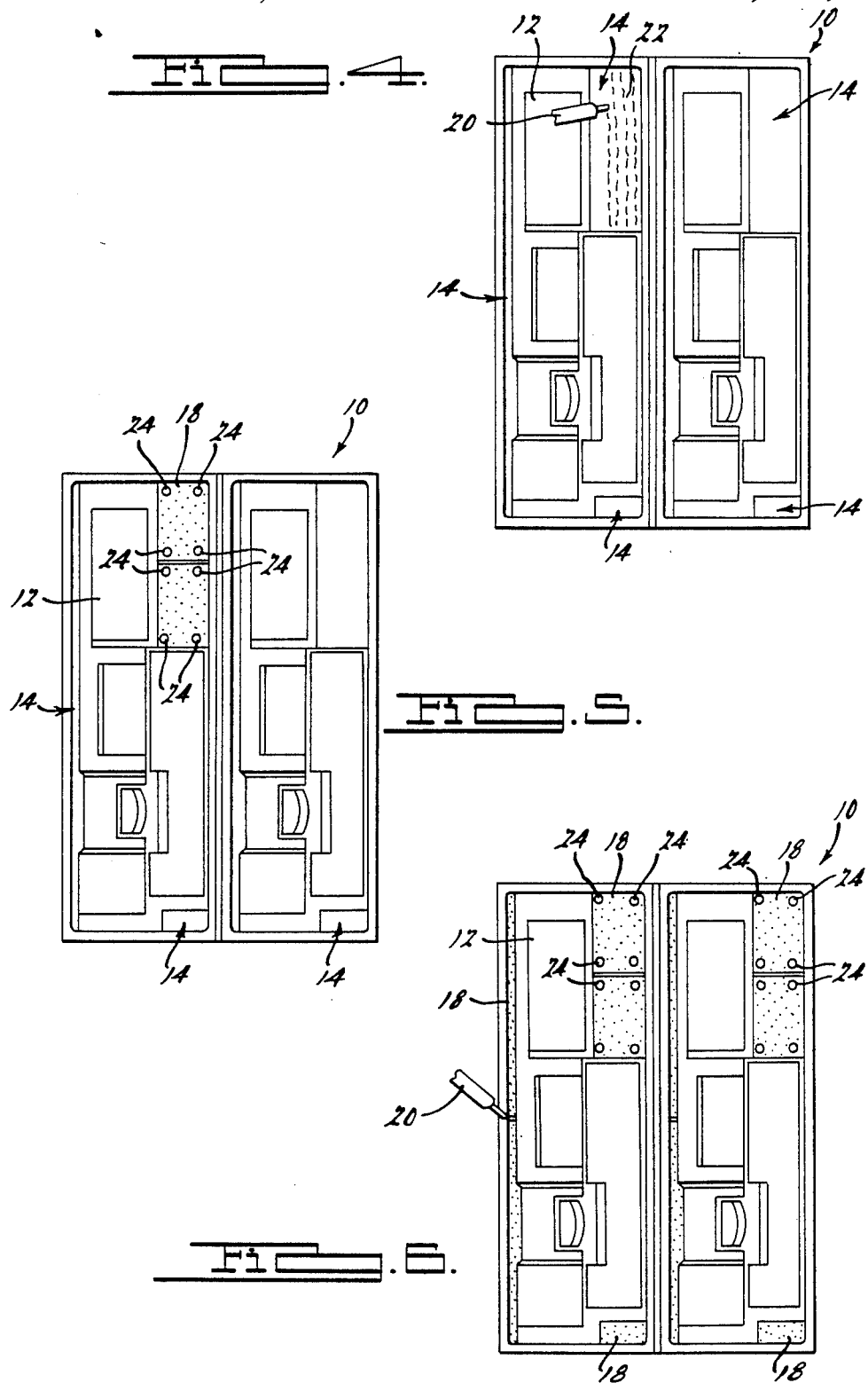

METHOD OF PRODUCING FASCIA PARTS

This is a division of U.S. Pat. application Ser. No. 106,181, filed Oct. 8, 1987 now U.S. pat. No. 4,822,438 entitled: METHOD FOR HEAT INSULATING A ROTATIONAL CASTING MOLD.

TECHNICAL FIELD

The present invention relates to an improved rotational casting mold of the type used for producing fascia type parts.

BACKGROUND

Rotational casting is a method of producing fascia type parts or other parts which require a thin skin type portion. For instance, the rotational casting process is used to produce instrument panel fascias in the automotive industry, but is also useful whenever a fascia type part which has a skin type layer having an even thickness and a contoured surface is desired to be produced.

Generally a rotational cast process consists of the use of a mold having an inner cavity which cavity has molding surfaces which are contoured to correspond to that of a finished part. Commonly the mold is configured in two halves each of which has a molding surface for a separate fascia part. Plastic powder molding material corresponding to the desired material used in the final part is introduced into the cavity formed by the two halves of the mold. The mold is then placed into an oven and then heated to a temperature which will induce flashing or melting on the molding surfaces in the plastic material used. To ensure an even thickness the mold is agitated or rotated to evenly distribute the plastic powder along the entire mold surfaces. Thus, as the plastic powder touches the heated mold surfaces it instantly flashes or melts and creates a uniform coating over the mold surfaces which is insured by the rotation and/or agitation of the mold. Subsequently the mold is allowed to cool and it then must be removed from the assembly, trimmed to its proper dimensions and may then be used.

Due to the nature of this process in that the two halves must be joined together and sealed so that the powder will not escape and will be distributed throughout the surfaces during the rotating and agitating process, the mold cavities are generally produced with extraneous or non-critical areas which are there to provide a joining of the two molds in the cavity or for other reasons other than to provide a molding surface for the final part. These extraneous or non-critical surfaces while necessary to the molding process create extra surfaces which cause unwanted flashing material in the finished product in that they are also heated during the casting process and subsequently powdered material coats these surfaces along with the critical molding surfaces. This creates undesirable extra material in the finished part which must be removed or trimmed from the part prior to installing the part or using the part in its finished form.

Thus, while the finished part obtained from this process creates a suitable part the process necessitates the step of trimming the part to remove the excess material which is somewhat time consuming and also creates extra material usage because of the wasted material which must be trimmed before shipping or using the final part. These extra steps are undesirable in that excess labor and product costs are consumed by such a procedure. Therefore, it is desirable to solve this problem of wasted labor and material in the rotational casting art to provide cost savings in production and also an improved finished product.

SUMMARY OF THE INVENTION

Therefore, according to the present invention there is provided a mold for a casting process wherein it is desirable to make a substantially even thickness fascia through placement of a plastic powder material into an enclosed mold in creating the part by heating and rotating the mold for distributing the powder for substantially evenly covering the surface of the mold. The present invention includes a first mold surface on the mold for defining critical portions of the mold which correspond to the desired portions for forming the finished part by melting and distribution of plastic powder for forming the plastic part. Second mold surfaces are provided on the mold, which include the non-critical portions of the mold wherein it is undesirable for such plastic filming to occur. An insulating material is attached to the second mold surface. The insulating material is for creating a temperature barrier on the second mold surfaces for reducing the effective temperature of the second mold surfaces whereby plastic powder will melt and form the uniform coating on the first surface and will not melt on the second surface.

Also provided in the present invention is a method for shielding a mold used in a rotational casting process whereby fascia parts having a substantially even surface are manufactured. The method includes cutting a plurality of sections from an insulating material. The sections correspond to discrete portions of the non-critical surfaces of said mold and are for assembly onto the non-critical surfaces. The non-critical surfaces are coated with a layer of heat resistant bonding material. The sections are then assembled onto their corresponding locations onto the surfaces of the mold and the assembly is allowed to cure, thereby providing the mold of the present invention.

It is therefore an object of the present invention to provide a molding assembly which will produce a finished part with reduced labor and less wasted material.

It is a further object of the present invention to provide a mold for use in a rotational casting process which will substantially reduce the amount of wasted material normally incident with such a process.

DESCRIPTION OF THE DRAWINGS

Other advantages of the present invention will be readily appreciated as the same becomes better understood by reference to the following description when considered in conjunction with the accompanying drawings wherein:

FIG. 4 is a perspective view showing the application of bonding material in the present invention;

FIG. 5 is a perspective view showing the assembling of the insulating material into the mold of the present invention;

FIG. 6 is a perspective view showing the process of sealing the seams for producing the mold of the present invention;

FIG. 7 is a perspective view showing the preparation of the molding assembly for molding the fascia part;

FIG. 8 is a perspective view showing the rotational molding apparatus being agitated for molding of a part by the method of the present invention;

FIG. 9 is a perspective view showing the removal of the finished part.

DESCRIPTION OF THE PREFERRED EMBODIMENT

Figure 1:
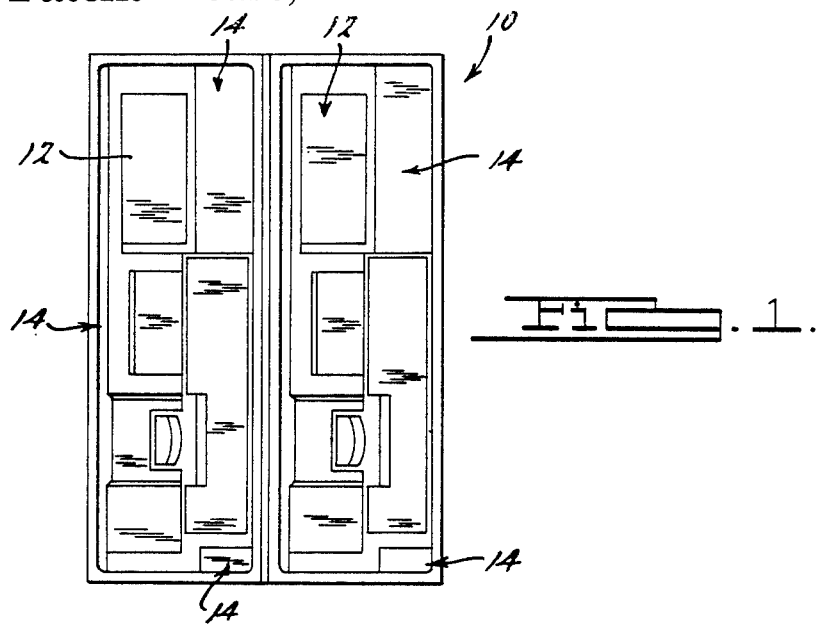
FIG. 1 is a perspective view of a typical molding assembly in which the present invention may be useful.

Referring now to FIG. 1 there is shown a rotational mold in which the invention may be used. Mold 10 includes critical surface portions 12 and non-critical portions 14. The critical portions 12 are those portions of the mold which define the shape of the final product which is desired. The non-critical portions 14 are those portions of the mold which do not provide any molding surfaces for the final part and which are extraneous to the molding of the final part. These non-critical surfaces may include flashing areas and other areas which may be useful in mating of the two halves of the mold together or for other purposes which are extraneous of the use in producing the actual shapes of the finished part. Thus, the non-critical areas include any surfaces of the cavity of the mold wherein it is undesirable or unwanted for plastic flashing or coating to occur.

Figure 2:
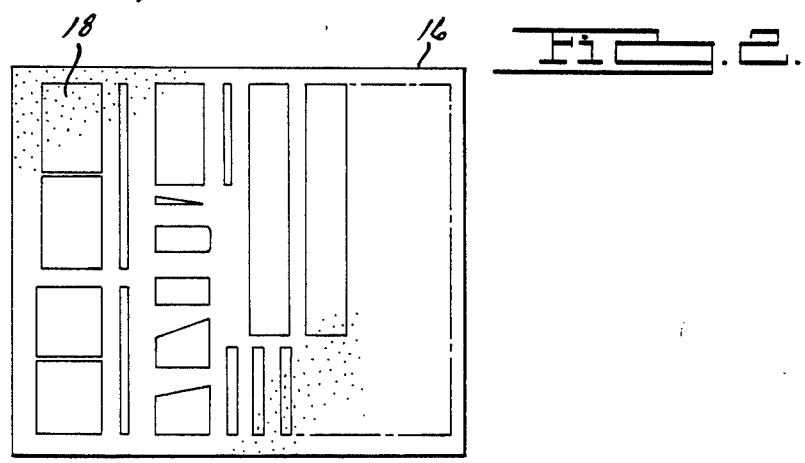
FIG. 2 is a perspective view showing the laying out of sections corresponding to the non-critical portions of the mold on an insulating material.

As shown in FIG. 2, these non-critical surfaces 14 are laid out on a insulating sheeting material 16 so that the sheeting material may be cut into sections 18 which correspond to respective parts on the mold 10 which correspond to surfaces in the non-critical section of the mold.

Figure 3:
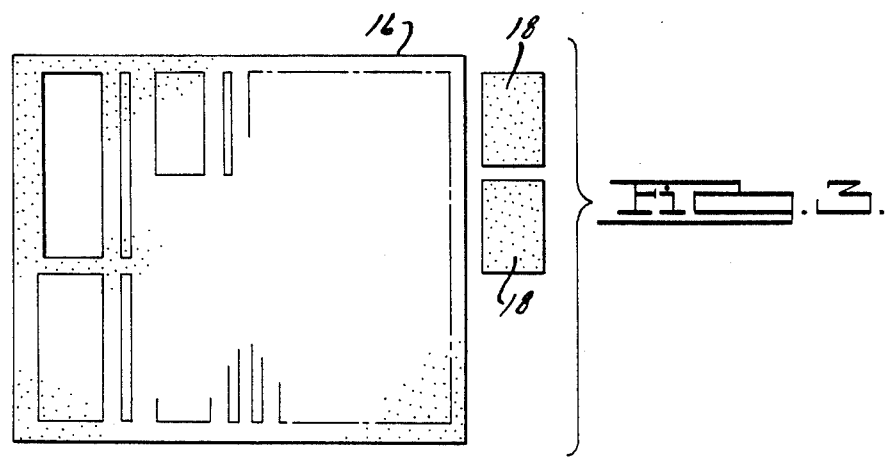
FIG. 3 is a perspective view showing the cutting out of sections from the insulating material for insulating in the mold of the present invention.

In FIG. 3 these sections are then cut out of the insulating material to provide for assembly onto the non-critical portions of the mold later in the present process. The insulating material may be of many types which will insulate the non-critical molding surfaces from heat build up which would cause plastic material to flash thereon and cover these surfaces. Preferably a phenolic sheeting material is used such as that generally used in circuit boards, however, any other insulating materials could be used which would insulate the non-critical molding surfaces such that plastic powder will not melt when coming into contact with the insulating material when used in the rotational casting process. In the preferred embodiment of the present invention a phenolic board NEMAgrade-3 is used which is about 0.250 inches thick.

As shown in FIG. 4 a silicone caulking material 20 is used and applied in a coating to all non-critical surfaces of the mold installation where the insulating sections are to be installed. Preferably the material used is a RTV silicone which is designated by GE102. However, other materials could be used which will withstand repeated heat and cool cycles and retain the adhesiveness. The silicone layer 22 is applied in an approximately ⅛ inch thick coating over the non-critical surfaces of the mold. The silicone material provides a bonding for the installation of the phenolic sheeting and also insulates the assembly further from heat transfers from the non-critical mold surfaces.

In FIG. 5 the sections which were cut out from the phenolic sheeting are then fitted into the respective places in the mold. As shown in FIG. 6, after the mold is allowed to dry partially such that the pieces are held into place, the installer will caulk all exposed edges and joints between the sections for providing an integration between the sections and further preventing any plastic from seeping between the phenolic board and the mold surfaces which would cause undesirable flashing of the plastic material.

At this point in time the individual sections may be further fastened onto the mold surface to provide a permanent installation. This fastening may be done by countersinking bolts 24 into the phenolic assembly. Bolts or screws 24 are then inserted through the phenolic sections 18 and into the mold to hold the phenolic sections 18 on the mold surfaces. Phenolic caps may then be fabricated to fill in voids left or cover exposed portions of the bolts after countersinking these bolts, by first inserting some silicone caulking material into the counter sunk holes and thereafter capping the holes with a phenolic plug. Alternatively, other insulating materials such as silicone adhesive may be used to insulate the exposed portions of the bolts or screws 24. This provides a further permanency to hold the silicone adhered phenolic board onto the non-critical molding surfaces of the rotational casting mold, alternatively, the phenolic sections may be secured with bolts or fasteners alone. Upon completion of this step the molding tool has the phenolic sections assembled. The installer must thereafter inspect all joints in the perimeter of the phenolic sections to ensure a good seal. The assembly must then be allowed to cure for approximately 48 hours in order to allow complete curing of the silicone caulking material which will further extend the life of the mold.

Thus, provided in the present invention is an improved casting mold in which the non-critical areas of the mold have been insulated by the phenolic sheeting process such that the surface temperature of the phenolic sheeting will not rise to a high enough temperature during the heating and agitation process to cause plastic powder which comes in contact with the critical surfaces to melt thereon. Thus, when the mold is placed into the oven and rotationally agitated the powder selectively melts onto the critical molding surfaces for forming the part but does not run off onto extraneous non-critical areas in the mold which are shielded by the phenolic. It is estimated that this will result in a 20 to 40 percent decrease in run off and therefore a resultant decrease in actual material used. Furthermore, this results in less man hour time in completing the molding of the part since the part requires less trimming or no trimming by using the method of the present invention.

As shown in FIG. 7 a powdered plastic material 26 is then placed in release cylinder 28 in the molding apparatus. The halves are then closed onto one another. The molds are placed in the rotational agitating apparatus and are heated and agitated for forming a part 30 as shown in FIG. 8. The rotational apparatus is moved to a large oven wherein the mold surfaces are heated from the outside. The assembly is rotated and agitated to provide for distribution of the plastic. This heating process will heat the critical surface areas to a flashing temperature of the plastic when the plastic powder touches the critical surfaces areas it will melt and form a film thereon which becomes the final part. In the present invention the phenolic insulation material will lower the temperature of the phenolic surface contacting the plastic powder below the flashing temperature of the plastic thereby eliminating wasted material since the plastic will not flash on these surfaces. Upon completion of this rotational agitation the molding apparatus is thereby cooled, the halves are opened and the part 30 may then be removed as shown in FIG. 9. Thus, the present invention provides a part which is substantially free from excess wasted material and may be removed and sent directly to an area for further processing or shipping out. Thus, the mold can be prepared in the manner described above and reused for further molding. It has been found that such a construction will withstand normal chemical cleaning processes used to clean these molds.

The invention has been described in an illustrative manner and it is to be understood that the terminology which has been used and is intended to be descriptive rather than limitative. Obviously, many modifications and variations of the invention are possible in light of the above teachings. Therefore, it is to be understood that within the scope of the amended claims the invention may be practiced otherwise than as specifically described.

What is claimed is:

1. A method for making a plastic fascia part whereby the final part requires substantially no trimming of extraneous material comprising the steps of:
   (a) providing a mold having critical molding surfaces for defining the shape of the final product desired, upon which critical surfaces coating of a plastic material occurs for forming the plastic fascia part and non-critical surfaces wherein it is undesirable for plastic coating to occur;
   (b) shielding the non-critical surfaces of the mold used in a rotational casting process with a heat insulating material by:
      (i) applying a layer of heat resistant bonding material to the non-critical surfaces;
      (ii) cutting a plurality of sections from a heat insulating material which correspond to the non-critical surfaces of the mold and fitting and securing the plurality of cut sections to the non-critical surfaces of the mold having the layer of heat resistant bonding material thereon; and
      (iii) allowing the heat resistant bonding material to cure;
   (c) releasing a plastic powdered material into the mold;
   (d) heating the mold to a temperature for melting the plastic powdered material;
   (e) rotationally agitating the mold for distributing the plastic powdered material onto the critical molding surfaces, whereby the plastic powdered material is melted and distributed onto the critical surfaces of the mold while being prevented from covering the non-critical surfaces of the mold by the heat insulating material secured to the non-critical surfaces of the mold which provides heat insulation for preventing melting of the plastic powdered material on the heat insulated non-critical surfaces thereby forming the plastic fascia part requiring substantially no trimming of extraneous material.

2. The process of claim 1 wherein the heat insulating material is a phenolic board material.

3. The process of claim 1 wherein the heat resistant bonding material is a silicone adhesive.

* * * * *